United States Patent [19]

Shapiro

[11] Patent Number: 4,524,243

[45] Date of Patent: Jun. 18, 1985

[54] PERSONAL ALARM SYSTEM

[75] Inventor: L. Dennis Shapiro, Chestnut Hill, Mass.

[73] Assignee: Lifeline Systems, Inc., Waltham, Mass.

[21] Appl. No.: 511,921

[22] Filed: Jul. 7, 1983

[51] Int. Cl.³ .......................................... H04M 11/04
[52] U.S. Cl. ..................................... 179/5 R; 340/573
[58] Field of Search ............. 179/2 R, 2 A, 5 R, 5 P; 340/573, 692; 455/5

[56] References Cited

U.S. PATENT DOCUMENTS

| | | |
|---|---|---|
| 3,188,392 | 6/1965 | Ferrell . |
| 3,312,508 | 4/1967 | Keller et al. . |
| 3,427,403 | 2/1969 | Stokes et al. ........................ 179/5 P |
| 3,531,597 | 9/1970 | Andrews et al. . |
| 3,611,344 | 10/1971 | Couper . |
| 3,662,111 | 5/1972 | Rubinstein .......................... 179/5 P |
| 3,989,900 | 11/1976 | Dibner ................................ 179/5 P |
| 3,996,578 | 12/1976 | Takeuchi et al. .................... 455/5 X |
| 4,064,368 | 12/1977 | Dibner ................................ 179/5 R |
| 4,284,849 | 8/1981 | Anderson et al. .................. 179/5 R |
| 4,347,501 | 8/1982 | Akerberg ......................... 340/573 X |
| 4,393,365 | 7/1983 | Kondo et al. .................... 340/692 X |
| 4,401,971 | 8/1983 | Saito et al. ...................... 340/692 X |

FOREIGN PATENT DOCUMENTS

| | | |
|---|---|---|
| 745768 | 2/1956 | United Kingdom . |
| 1043568 | 9/1966 | United Kingdom . |

Primary Examiner—Keith E. George
Attorney, Agent, or Firm—Weingarten, Schurgin Gagnebin & Hayes

[57] ABSTRACT

A personal alarm system operative to provide a warning at a central monitoring station indicative of subscriber inactivity. The system comprises a subscriber station which interfaces to a communications link and a remote central monitoring station also interfaced to the link and operative to receive and analyze messages transmitted to the monitoring station by the subscriber station. The subscriber station transmits an alert message to the monitoring station over the communication link if the subscriber fails to reset clock logic via a reset switch or activity sensor within a predetermined time interval. An annunciator may be activated at the subscriber station coincident with transmission of the alert message. If the subscriber fails to activate a reset switch or a selected activity sensor within a predetermined period, the monitoring station provides an inactivity alarm indication to an operator who will take appropriate action. The system is primarily intended for the elderly, infirm, or incapacitated who are living alone and who, in event of illness or injury, might be unable to summon assistance and thereby suffer further harm as a result of inattention. The availability of this system will permit the aging and infirm to live independently without this fear.

42 Claims, 7 Drawing Figures

PERSONAL ALARM SYSTEM

FIELD OF THE INVENTION

This invention relates to a monitoring device for old or infirm people who live alone and may be unable to summon help should such help be needed.

BACKGROUND OF THE INVENTION

Many old or infirm people who live alone are unable to summon help should they become incapacitated. Individuals may in extreme situations expire or suffer irreparable personal harm or further injury resulting from their inability to summon help. Where individuals are living alone, their condition may not be detected for days. Services have been made available which provide for periodic checks on isolated persons, but these services are costly and may be unreliable.

In attempts to address this well-known problem in a society with an aging population, various systems have been developed which automatically call for help by use of a telephone or other means if a patient is unable by reason of infirmity or incapacity to prevent automatic transmission of a message indicating the need for help.

One patented alarm system (Rubinstein U.S. Pat. No. 3,662,111) is actuated by default of the owner. The system generates a local alarm as predetermined time intervals which, if not reacted to by the owner, results in automatic dialing and transmission of a prerecorded message.

Another automatic telephone alarm system is disclosed in U.S. Pat. No. 3,989,900 to Dibner. In this system a timer cyclically activates an automatic telephone dialer and a prerecorded message is thereupon transmitted. The timer simultaneously activates an audible warning signal so that the patient may abort transmission of the message if no assistance is required. The timer is automatically reset each time the patient removes the handset during normal telephone usage to minimize the need for manual intervention by a patient to avoid false alarm transmission.

Still another emergency alarm and response system is disclosed by Dibner in U.S. Pat. No. 4,064,368 in which a digital transceiver is connected to a patient's telephone line. The system may be triggered by an emergency button or when a timer achieves a predetermined value. The system transmits identification and alarm codes to a compatible digital transceiver at a remote monitoring station and simultaneously activates an annunciator at the patient's residence. The monitoring station digital receiving unit upon receipt of a message, transmits an acknowledgement to the respective system disposed in the patient's residence thereby changing the "alarm signal" to a "call received" signal. An operator at the monitoring station thereupon dispatches an individual to the patient's residence to further investigate the incident.

Other auto-dialing systems are disclosed in U.S. Pat. Nos. 3,188,392; 3,427,403; and 3,531,597.

Systems for assessing alertness of an individual or vehicle operator employing well-known watch clock mechanisms are disclosed in U.S. Pat. Nos. 3,611,344; 3,312,508; British Pat. No. 1,043,568; and British Pat. No. 745,768.

SUMMARY OF THE INVENTION

In accordance with the present invention a personal alarm system is disclosed which provides a warning at a central monitoring station indicative of subscriber inactivity. That system includes a subscriber station and a remote central monitoring station. The subscriber station and the central monitoring station interface to a communications link and means are provided to transmit predetermined messages from the subscriber station to the monitoring station over the link upon prescribed conditions.

The subscriber station includes resettable clock logic operative to provide an inactivity alert signal at desired time intervals. In a typical operational mode, the clock provides an inactivity alert signal at twenty-four hour intervals. The station further includes a reset switch and may include activity sensors which, when activated, reset the clock logic and initiate a new timing interval. The inactivity alert signal is generated only upon the expiration of a full timing interval. Consequently, if the reset switch or an activity sensor is activated periodically prior to the expiration of the full clock timing interval, the inactivity alert signal occurrence is deferred.

Upon the occurrence of the inactivity alert signal, a communication channel is established between the subscriber station and the central monitoring station and an "inactivity alert message" is transmitted by the subscriber station to the central monitoring station. The message contains subscriber identification information and identifies the message as an "inactivity alert message". Coincident with transmission of the "inactivity alert message" an annunciator is activated at the subscriber station to provide an indication to the subscriber that the message has been transmitted.

The central monitoring station, upon receipt of the "inactivity alert message" activates a monitor timer, which typically is adapted to time an interval of approximately five minutes. If the central monitoring station receives no additional messages from the subscriber station during the monitor timer interval, the monitoring station automatically alerts an operator who takes appropriate action to investigate the reason for subscriber inactivity.

The operator may, in response to the "inactivity alert message", telephone the subscriber, if possible. If unable to reach the subscriber by telephone the operator will typically dispatch a responder to the subscriber station location to ascertain the reason for subscriber inactivity.

If a subscriber activates the reset switch or a selected activity sensor after subscriber station annunciator activation, and within the monitor timer interval, an "alert cancel message" is transmitted to the central monitoring station by the subscriber station. The "alert cancel message" includes subscriber identification information and may include coded information that the message is an "alert cancel message". The "alert cancel message" signifies to the central monitoring station that the subscriber is alert and active and that a responder need not be dispatched to the responder station and that no additional response is needed.

In one embodiment of the invention the subscriber station includes timer logic activated by the inactivity alert signal which times an interval substantially coterminous with the monitor timer interval. If a subscriber activates the reset switch or an activity sensor during the active period of the timer logic time interval, the subscriber station may transmit the second message to the central monitoring station specifically identifying the message as an "alert cancel message". Additionally, if the local timer time interval expires and the reset switch or selected activity sensor is thereupon actuated, a "responder arrived message" including message and subscriber identification information may be transmitted to the central monitoring station by the subscriber station.

DESCRIPTION OF THE DRAWINGS

The invention will be more fully understood by reference to the following discussion and accompanying drawings in which.

DETAILED DESCRIPTION OF THE INVENTION

Figure 1:
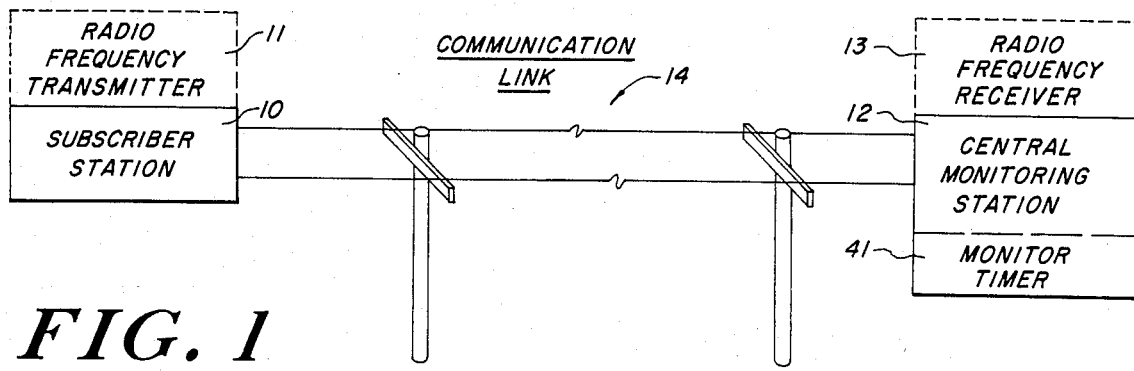
FIG. 1 is a system block diagram.

In accordance with the present invention, a personal alarm system is disclosed. The system provides a warning to a subscriber at a subscriber station and provides an indication at a remote central monitoring station that the subscriber has been unusually inactive if the subscriber does not respond within a predetermined time interval to an annunciator activated by the subscriber station. The failure of the subscriber to respond to the annunciator signal by resetting the system within a relatively short period causes the central monitoring station to indicate an alarm condition. When an alarm condition is noted by an operator at the central monitoring station, appropriate action is taken by the operator to investigate the cause of subscriber inactivity. The operator will telephone the subscriber if possible. If the operator is unable to reach the subscriber by telephone, a responder is typically dispatched to the location of the subscriber station to investigate the reason for subscriber inactivity. If a subscriber has become seriously ill, has been injured seriously, or is otherwise unable to summon help or assistance, the present invention thereby assures that assistance will be rendered. The benfits of a system, in accordance with the present invention, for the elderly, infirm or incapacitated are readily apparent.

Referring to the drawings, the system includes a subscriber station 10 which is typically located in the home of a system subscriber. Upon the occurrence of predefined conditions, the subscriber station 10 is operative to transmit one or more messages to a central monitoring station 12 over a communications link 14. The communications link 14, may comprise a telephone line communications link, a cable television communications link, a radio frequency communications link, a directly wired communications link or any other suitable means for transmission of messages from the subscriber station 10 to the central monitoring station 12.

When a radio frequency communication link is employed, the subscriber station 10 includes a radio frequency transmitter 11 and the central monitoring station 12 includes a radio frequency receiver 13 for wireless transmission of messages from the subscriber station 10 to the central monitoring station 12. The radio frequency transmitter 11 and receiver 13 may be any type well known in the art.

Figure 2:
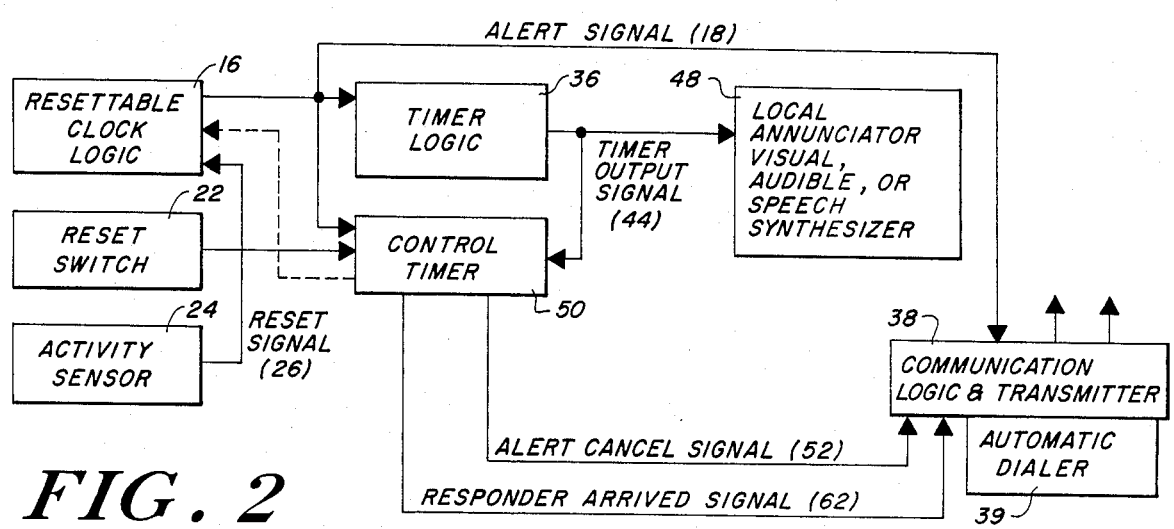
FIG. 2 is a block diagram of a subscriber station including a local timer in accordance with the present invention.
Figure 3:
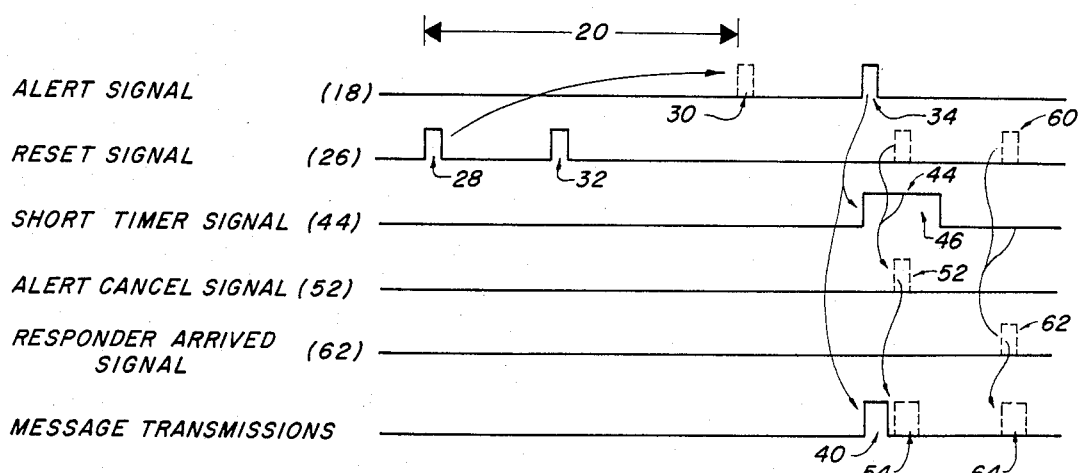
FIG. 3 is a timing diagram illustrative of the timing of selected signals of the station of FIG. 2.

Operation of one embodiment of a subscriber station 10 in accordance with the present invention, will be understood by reference to FIG. 2 in conjunction with the purely illustrative timing diagram of FIG. 3.

The subscriber station 10 includes clock logic 16 which is normally operative to produce an alert signal 18 at periodic or predetermined intervals 20. The clock logic 16 may comprise a resettable electronic counter which counts from a first preset value to a final preset value and then generates the alert signal 18. Alternatively the clock logic 16 may comprise a resettable mechanical timer which produces an alert signal 18 at predetermined intervals.

A reset switch 22 and one or more activity sensors 24 are operative to produce a reset signal 26 which resets the clock logic 16 to its initial value upon switch 22 or sensor 24 activation thereby delaying the occurrence of the alert signal 18 by a period equal to the time expired during the previous interval 20. Activity sensors may include sensors which detect the lifting of a telphone handset and other sensors such as door switch sensors, television power on/off sensor or any other sensors indicative of subscriber activity. The resettable clock logic will be understood by reference to the following example.

It is assumed for purposes of this example that the clock logic 16 is operative to produce an alert signal 18 every twenty-four hours. At time zero, the reset switch 22 is activated thereby producing a reset signal 28 and resetting the clock logic 16. An alert signal 30 would therefore occur after a twenty-four hour interval 20 from the time at which the reset switch 22 was activated at time zero. However, now assume that a subscriber activates the reset switch 22 or an activity sensor 24 producing a reset signal 32 four hours after generation of the initial reset signal 28. The alert signal 30, as a consequence of the intervening reset signal 32, will not be produced twenty-four hours after reset signal 28, but rather, twenty-four hours after reset signal 32 thereby delaying the generation of the alert signal 30 by four hours resulting in a delayed alert signal 34 as shown.

The occurrence of an alert signal 18 results in activation of the timer logic 36 and the communication logic and transmitter 38.

The communication logic and transmitter 38, in response to the alert signal 18, transmits a first message 40 over the communications link 14 to the central monitoring station 12. If the communications link 14 is a telephone line communications link, the logic 38 includes an automatic dialer 39 of a type well-known in the art, which automatically dials the telphone number of the central monitoring station 12 in preparation for transmission of the first message 40. The first message is an alert message indicative of subscriber inactivity during the preceeding time interval 20 (in the illustrative example, the interval between reset signal 32 and the occurrence of the alert signal 34). The alert message includes subscriber identification information and may also include information identifying the transmission as an alert message.

Upon receipt of the alert message 40, the central monitoring station 12, which may include a microprocessor, minicomputer or mainframe computer within the monitoring station, activates a monitor timer 41. The monitor timer 41 produces an output signal or otherwise times a monitor timer interval 42 initiated upon alert message 40 receipt. Typically, the monitor timer interval 42 is a time interval of approximately five minutes. Additionally, the monitoring station 12 may produce an output signal which is an audible signal, visual signal, or printed message indicating to an operator that an alert message has been received.

As previously indicated the alert signal 18 also activates subscriber station 10 timer logic 36. The timer logic 36 generates a short timer output signal 44 having a predetermined active time interval 46. The timer output signal 44 is applied to and activates a local annunciator 48 and is also applied to control logic 50.

The local annunciator 48 may be a visual annunciator, an audible annunciator, or any other annunciator suitable to provide an output signal detectable by a subscriber. The annunciator 48 may be activated for the duration of the time interval 46, may be only momentarily activated as desired, or may provide an intermittent signal. The annunciator may also comprise a speech synthesizer or other verbal annunciator operative to provide a verbal warning that the alert signal 18 has been activated. Additionally, a verbal annunciator may contain a vocal message advising the subscriber that the system should be promptly reset.

If the subscriber activates the reset switch 22 or an activity sensor 24 other than a telephone handset activity sensor within the time interval 46 of the timer signal 44, the control logic 50 generates an alert cancel signal 52 which is applied to the communication logic and transmitter 38. In response to the alert cancel signal 52, the communication logic and transmitter 38 transmits a second message 54 to the central monitoring station 12. The second message 54 is an alert cancel message which indicates to the central monitoring station 12 that no assistance is required at the subscriber station 10 despite an interval 20 of subscriber inactivity. Lifting the telephone handset does not activate a respective activity sensor to avoid telephone line contention in the event of telephone line communications link usage since the subscriber may simply be placing a phone call or answering the telephone. If the communications link is a telephone communications link, the automatic dialer activates a second autodialing sequence to complete the communication link between the subscriber station 10 and the central monitoring station 12 prior to message 54 transmission. The first message 40 and the second message 54 may be digitally encoded and serially transmitted in accordance with any technique well known in the art.

The alert cancel message 54 contains subscriber identification information and may optionally include message identification and other desired data.

Upon receipt and decoding of the alert cancel message 54 during the monitor timer interval 42, the central monitoring station 12 may produce a second output message 56 which is an audible signal, a message on a video display, or an appropriate printed message indicating that the subscriber has reset the subscriber station 10 by activation of the reset switch 22 or one of the activity sensors 24 and that no further assistance is required by the subscriber. Once again it is noted that the telephone handset activity sensor is not operative to activate transmission of an alert cancel message.

If the monitor timer interval 42 expires before an alert cancel message 56 is received, the central monitoring station 12 produces an alarm message 58 including subscriber identification, message identification, the time and any other data desired. The alarm message 58 may be displayed on a video display and a printed record of the alarm condition is typically generated.

In response to an alarm message 58 an operator at the central monitoring station 12 takes appropriate action, as previously discussed, to investigate the cause of the alarm. If a responder is dispatched, upon arrival the responder activates the reset switch 22 or one of the activity sensors 24 other than a telephone handset activity sensor. Activation of the switch 22 or a sensor 24 produces a reset pulse 60 which is applied to the control logic 50. The control logic 50, in response to the reset pulse 60, generates a responder arrived signal 62, which is applied to the communication logic and transmitter 38. In response to the responder arrived signal 62 the communication logic and transmitter 38 transmits a third message 64. The third message 64 is a "responder arrived message" which includes subscriber identification information and may additionally include message identification data. Upon receipt and decoding of the "responder arrived message", the central monitoring station 12 outputs a message 66 to a station 12 operator including the subscriber identification and time, and indicating that the responder has arrived at the subscriber station 10 to render any aid or assistance that may be required. Telephone handset activity sensors do not activate a "responder arrived message" transmission to avoid contention for a telephone line if a telephone line communications link is utilized.

Figure 4:
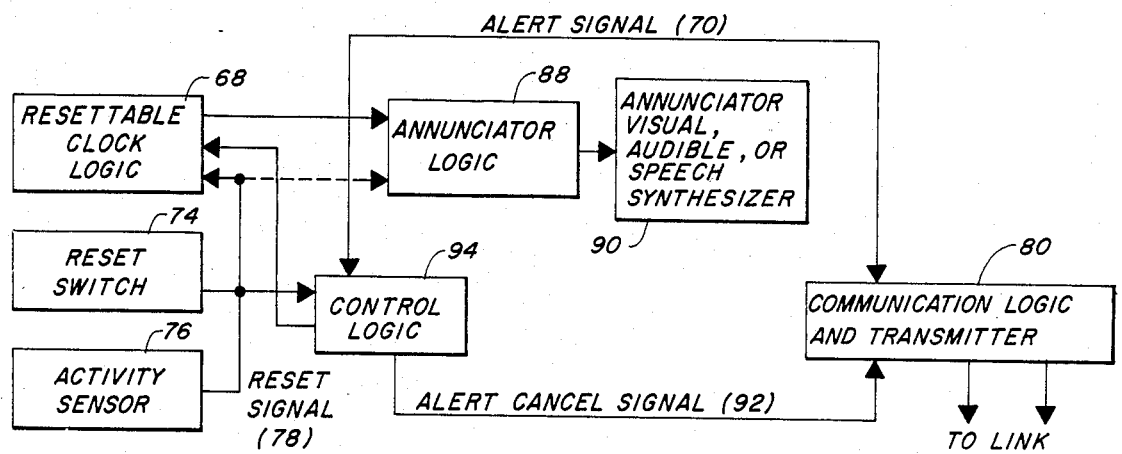
FIG. 4 is an alternative block diagram of a subscriber station without a local timer in accordance with the present invention.
Figure 5:
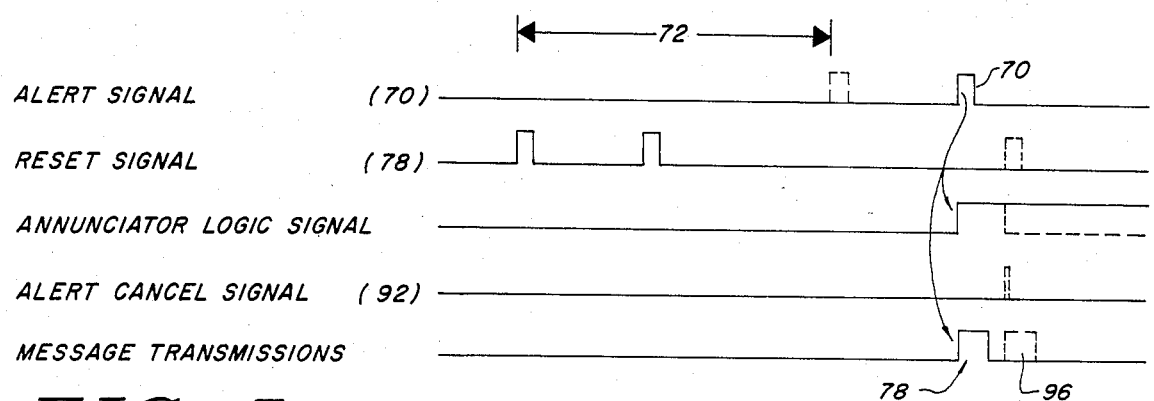
FIG. 5 is a timing diagram illustrative of the timing of selected signals of the station of FIG. 4.
Figure 6:
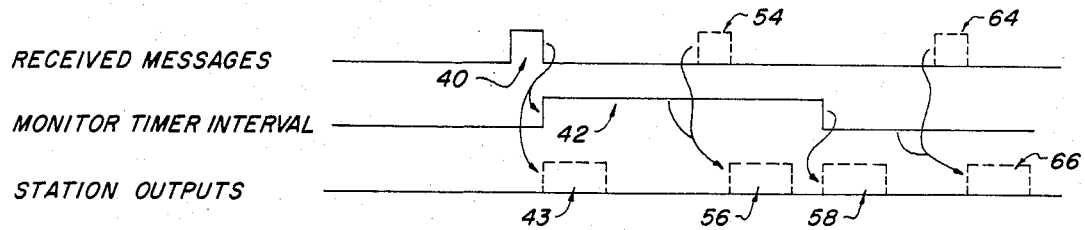
FIG. 6 is a timing diagram illustrative of central monitoring station operation in conjunction with the subscriber station of FIG. 2.
Figure 7:
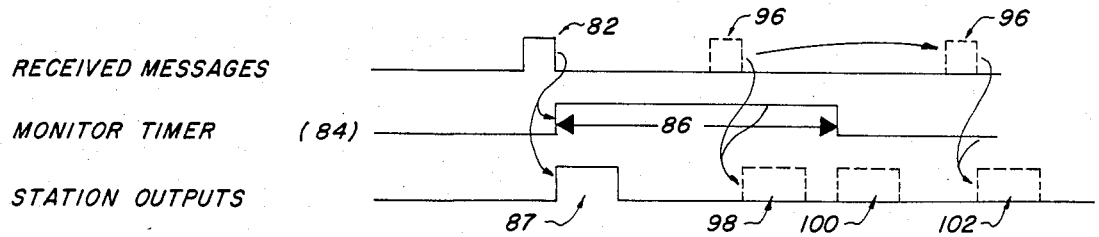
FIG. 7 is a timing diagram illustrative of central monitoring station operation in conjunction with the station of FIG. 4.

In another embodiment of the invention illustrated in the block diagram of FIG. 4 and timing diagram of FIG. 5, no timer logic corresponding to timer logic 36 of FIG. 2 is incorporated.

The resettable clock logic 68 is operative to produce alert signals 70 at predetermined intervals 72. Alert signals 70 are delayable upon activation of a reset switch 74 or an activity sensor 76. Switch 74 and sensor 76 serve to generate a reset pulse 78 in accordance with the previous discussion regarding the operation of the FIG. 2 embodiment. The alert signal 70 is applied to the communication logic and transmitter 80 upon activation by the alert signal 70. Upon the occurrence of an alert signal 70 the communication logic and transmitter 80 transmits a first message 82 over the communications link 14 to the central monitoring station 12. The first message 82 is an inactivity alert message which indicates to the central monitoring station 12 that the subscriber has failed to activate the reset switch 74 or an activity sensor 76 within the interval 72.

Upon receipt and decoding of the first message 82 by the central monitoring station 12, the station 12 activates a monitor timer 41 which produces an output signal 84 or is otherwise operative to time an interval 86. Additionally, upon receipt of the first inactivity alert message 82, the station 12 may provide an output message 87 in the form of an audible alarm, a visually displayed message, or by providing a printed message to a central monitoring station 12 operator. A printed or visually displayed message may include subscriber idenification, message identification information and may also include the time of message receipt.

Coincident with first message 82 transmission by the subscriber station 10, the alert signal 70 is applied to annunciator logic 88 which is operative to activate an annunciator 90. The annunciator 90 provides the subscriber with an indication that the first message 82 has been transmitted to the central station 12. The annunciator 90 may be momentarily actuated by annunciator logic 88 or may be reset by annunciator logic 88 upon subsequent activation of the reset switch 74 or one of the activity sensors 76.

In response to the annunciator 90 signal the subscriber, if he or she is able, promptly activates the reset switch 74 or one of the activity sensors 76 causing an alert cancel signal 92 to be applied to the communication logic and transmitter 80 by control logic 94. The telephone handset activity sensor is not operative to activate subscriber station 10 message transmission, in the event a telephone line communication link is utilized as explained in connection with the FIG. 2 embodiment.

The logic 80, in response to the cancel signal 92 transmits a second message 96 over the link 14 to the central monitoring station 12. If the second message 96 is received by the central station 12 during monitor timer 42 interval 86, the station 12 may provide an output message 98 containing subscriber identification and time information.

Since no timer logic 36 is included in the subscriber station, the subscriber station 10 cannot discriminate between the activation of the reset switch 74 or an activity sensor 76 during the monitor timer interval 86 or after the interval. Therefore, the second message 96 indicates only that in response to the alert signal 70 a second message 96 was transmitted.

If the second message 96 is received during the monitor interval 86, it is deduced by the central monitoring station 12 that the message 96 is an alert concel message.

If no message 96 is received by the central monitoring station 12 within the interval 86, the station 12 outputs an alarm message 100 to the station 12 operator. If the reset switch 74 or an activity sensor 76 (other than a telephone handset activity sensor in the event of telephone line communications link usage) is activated by a responder after expiration of the interval 86, the subscriber station 10 message 96 that is transmitted is identical in content to the message 96 that would have been transmitted before expiration of the interval 86 in response to subscriber activity. The central monitoring station 12, upon receipt of a message 96 after expiration of the interval 86, outputs a message 102, to the station 12 operator. The message 102 includes subscriber identification information and may include a responder arrived message deduced by the station 12 based upon the arrival of the message 96 after expiration of the monitor timer interval 86. Thus it is apparent that the present invention has operative embodiments both including and excluding timer logic 36 in the subscriber station 10.

The above examples and discussion are solely illustrative of a system operative in accordance with the present personal alarm system and the scope of this invention is to be considered limited only by the following claims.

What is claimed is:

1. A subscriber station for transmission of information over a a communications link to a central monitoring station and indicative of subscriber inactivity comprising:

means operative to provide an alert signal at predetermined time intervals;

switch means;

means operative to transmit a first message over said communications link to said central monitoring station in response to said alert signal;

means operative to transmit a second message over said communications link to said central monitoring station within a selected period following the occurence of said alert signal upon activation of said switch means.

2. The subscriber station of claim 1 including means operative to delay the occurrence of said alert signal in response to subscriber actuation of said switch means.

3. The subscriber station of claim 2 wherein said alert signal is indicative of subscriber inactivity corresponding to the failure by the subscriber to activate said switch means within a predetermined time interval prior to generation of said alert signal.

4. The subscriber station of claim 3 wherein said first message is an "inactivity alert message" which indicates to the central monitoring station that the subscriber has failed to actuate said switch means within a predetermined time interval prior to generation of said alert signal.

5. The subscriber station of claim 4 wherein said first and second messages are digitally coded and serially transmitted over said communications link to said central monitoring station.

6. The subscriber station of claim 4 wherein said first message includes subscriber identification and message identification information.

7. The subscriber station of claim 4 wherein said second message includes at least subscriber identification information.

8. The subscriber station of claim 2 wherein said switch means comprises a reset switch.

9. The subscriber station of claim 2 wherein said switch means includes a reset switch and at least one activity sensor.

10. The subscriber station of claim 2 wherein said switch means includes a sensor operative to sense the lifting of a telephone handset.

11. The subscriber station of claim 2 wherein said communications link is a telephone line communications link and said subscriber station includes an automatic telephone dialer operative to dial the central monitoring station at a specified telephone number to effectuate transmission of each of said messages.

12. The subscriber station of claim 2 further including an annunciator activated in response to said alert signal.

13. The subscriber station of claim 12 wherein said annunciator is a visual annunciator.

14. The subscriber station of claim 12 wherein aid annunciator is an audible annunciator.

15. The subscriber station of claim 12 wherein said annunciator is a verbal annunciator.

16. The subscriber station of claim 15 wherein said verbal annunciator is a speech synthesizer.

17. A subscriber station for transmission of information over a communications link to a central monitoring station and indicative of subscriber inactivity comprising:

means operative to provide an alert signal at predetermined time intervals;

switch means actuatable by a subscriber;

means operative to transmit a first message over said communication link to said central monitoring station in response to said alert signal;

timer means activated in response to said alert signal and operative to produce a timer output signal defining a timer period of predetermined duration;

means operative to transmit a second message over said communications link to said central monitoring station upon subscriber activation of said switch means during said timer period.

18. The subscriber station of claim 17 including means operative to delay the occurrence of said alert signal in response to subscriber actuation of said switch means.

19. The subscriber station of claim 18 including means operative to transmit a third message over said communications link to said central monitoring station upon actuation of said switch means within a defined interval after said timer period.

20. The subscriber station of claim 19 wherein said third message is indicative to the central monitoring station of activity at the subscriber station.

21. The subscriber station of claim 17 wherein said first and second messages are digitally coded and serially transmitted over said communications link to said central monitoring station.

22. The subscriber station of claim 17 wherein said first message includes subscriber identification and message identification information.

23. The subscriber station of claim 17 wherein said second message includes at least subscriber identification information.

24. The subscriber station of claim 17 wherein said switch means comprises a reset switch.

25. The subscriber station of claim 17 wherein said switch means comprises a reset switch and at least one activity sensor.

26. The subscriber station of claim 24 wherein said switch means includes a sensor operative to sense the lifting of a telephone handset.

27. The subscriber station of claim 17 wherein said communications link comprises a telephone line communications link and said subscriber station further includes an automatic telephone dialer operative to dial the central monitoring station at a specified telephone number to effectuate transmission of each of said messages.

28. The subscriber station of claim 17 further including an annunciator activated in response to said alert signal.

29. The subscriber station of claim 28 wherein said annunciator is operative for the duration of said timer period.

30. The subscriber station of claim 28 wherein said annunciator is a visual annunciator.

31. The subscriber station of claim 28 wherein said annunciator is an audible annunciator.

32. The subscriber station of claim 28 wherein said annunciator is a verbal annunciator.

33. The subscriber station of claim 32 wherein said verbal annunciator is a speech synthesizer.

34. A personal alarm system for transmittal of information indicative of subscriber inactivity over a communications link, comprising:

a central monitoring station coupleable to the communications link and comprising:

alarm indicating means;

central processing means; and monitor timing means operative to provide a predetermined interval, said monitor timing means activated upon receipt by said central monitoring station of a first message over said communications link;

a subscriber station coupleable to the communications link and comprising:

means operative to provide an alert signal at predetermined time intervals;

switch means actuatable by a subscriber;

means, responsive to said alert signal, operative to transmit said first message over said communications link to said central monitoring station; and means operative to transmit a second message over said communications link to said central monitoring station upon subscriber activation of said switch means after activation of said alert signal;

said central monitoring station operative to activate said alarm indicating means if a second message is not received by said central monitoring station during said monitor timing means predetermined interval.

35. The system of claim 34 wherein the subscriber station includes means operative to delay the occurrence of said alert signal for a predetermined time period in response to subscriber actuation of said switch means.

36. The system of claim 34 wherein said communications link comprises a telephone line communications link.

37. The system of claim 36 wherein said subscriber station includes an automatic telephone dialer operative to automatically dial a predetermined telephone number to effectuate transmission of each of said messages.

38. The system of claim 34 wherein said communications link comprises a cable television communications link.

39. The system of claim 34 wherein said subscriber station includes a radio frequency transmitter, said central monitoring station includes a radio frequency receiver and said communications link comprises a wireless radio frequency communications link.

40. The system of claim 34 wherein said means for providing said alert signals includes a resettable timer.

41. The system of claim 34 wherein the subscriber station includes:

timer means, activated in response to said alert signal and operative to produce a timer output signal defining a timer period of predetermined duration;

said means operative to transmit a second message being operative upon subscriber activation of said switch means during said timer period;

said central monitoring station alarm indicating means being activated by said central processing means if said second message is not received from said subscriber station by said central monitoring station during said monitor timing means predetermined interval.

42. The system of claim 41 wherein the subscriber station includes means operative to transmit a message over said communications link to said central monitoring station upon actuation of said switch means within a defined period after expiration of said timer period.

* * * * *